United States Patent

Wiesener

[15] 3,650,410
[45] Mar. 21, 1972

[54] TRUE MOTION MINIATURE MANIPULATOR

[72] Inventor: Robert W. Wiesener, Roseville, Minn.
[73] Assignee: Programmed & Remote Systems Corporation, St. Paul, Minn.
[22] Filed: Nov. 25, 1969
[21] Appl. No.: 879,838

[52] U.S. Cl. ......................................... 214/1 CM, 214/143
[51] Int. Cl. .................................................. B25j 3/00
[58] Field of Search ............................. 214/1 CM, 143

[56] References Cited

UNITED STATES PATENTS 3,314,552  4/1967  Vertut ........................ 214/1 CM
3,335,620  8/1967  Vertut ........................ 214/1 CM

*Primary Examiner*—Gerald M. Forlenza
*Assistant Examiner*—Lawrence J. Oresky
*Attorney*—Dugger, Peterson, Johnson & Westman

[57] ABSTRACT

A compact or miniature master-slave manipulator which is made primarily for light duty work, and which is inexpensive to manufacture. Structure is employed which permits the true motion of the arms of the manipulator, so that when the master side is raised, the slave side will also be raised, for example.

10 Claims, 7 Drawing Figures

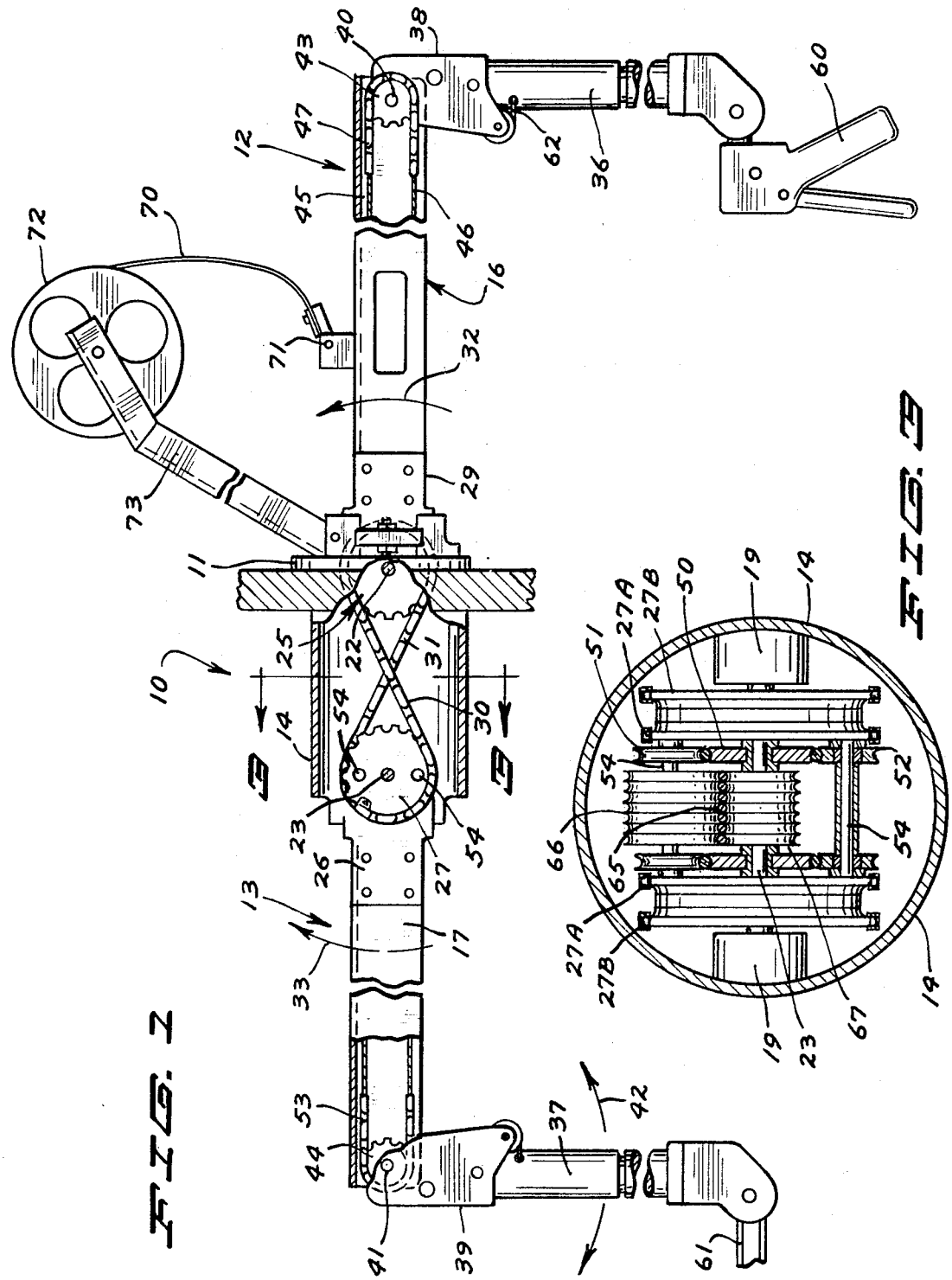

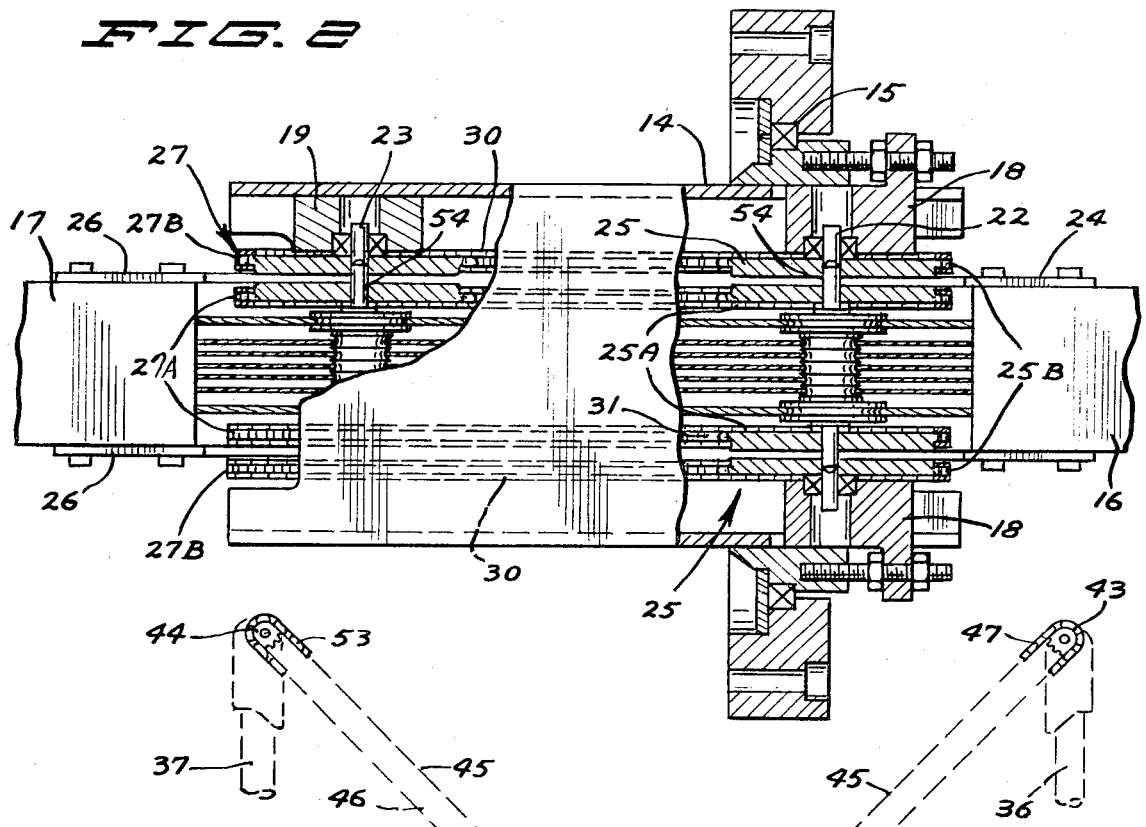
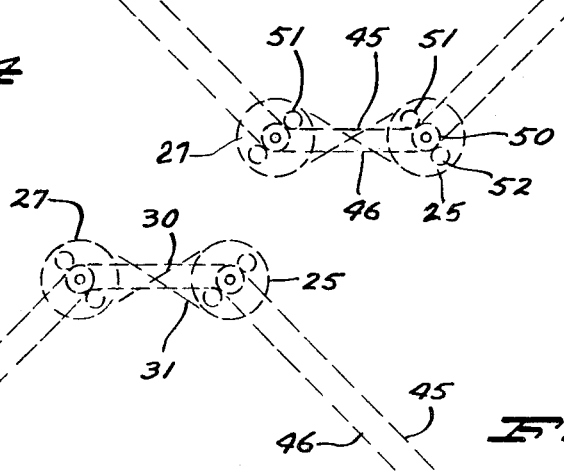
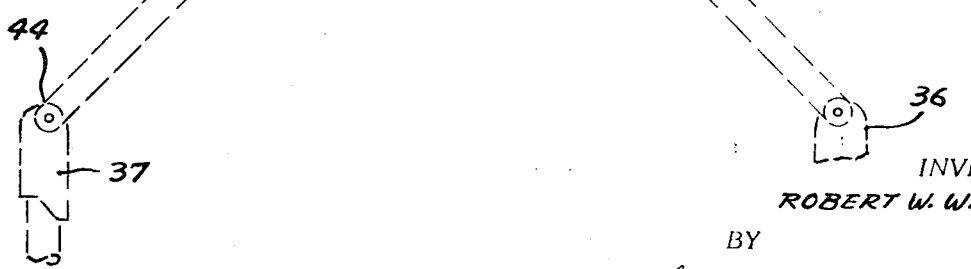

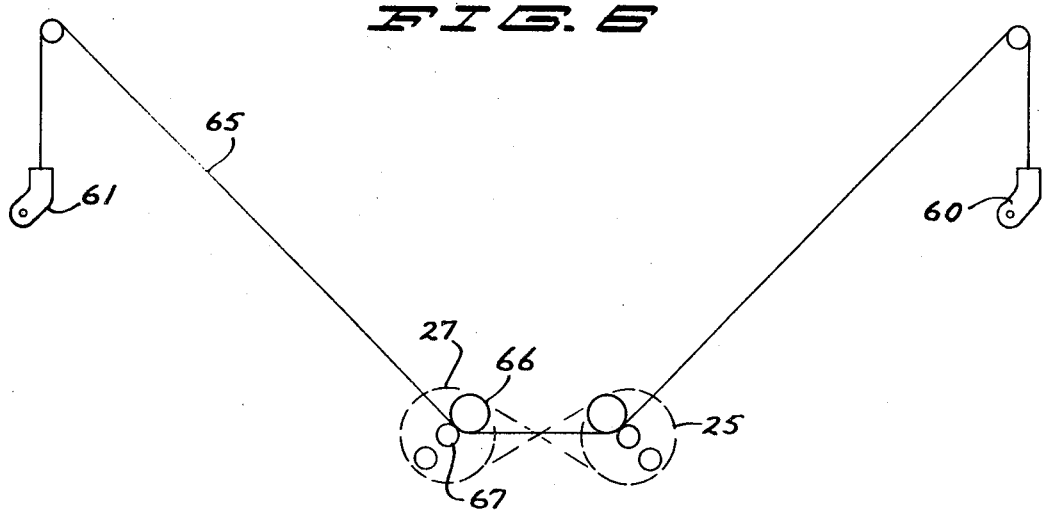
FIG. 6
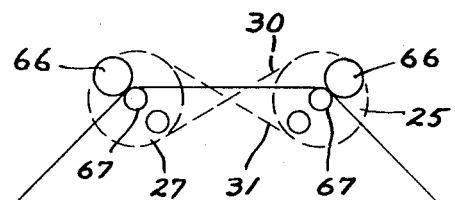
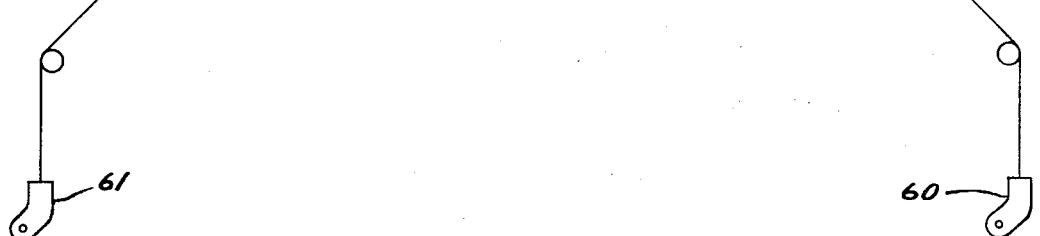
FIG. 7
INVENTOR.
ROBERT W. WIESENER

TRUE MOTION MINIATURE MANIPULATOR

BACKGROUND OF THE INVENTION

1. Field of the Invention

The present invention relates to remote control manipulators or mechanical arms that manipulate articles at a position remote from the operator.

2. Prior Art

A light duty master-slave manipulator is shown in the U.S. Patent to Ralph B. Specht, U.S. Pat. No. 3,212,651. One of the problems with the manipulator operating in the mode shown therein is that when the master side of the manipulator is raised, or the "Z motion" is operated, the slave side will lower. Thus, it is not a true motion manipulator, but has opposing motion. U.S. Pat. Nos. 3,335,620 and 3,314,552 both issued to Vertut show structure which accomplishes the obtaining of "true motion" between pivoted arms fastened close to the support for the arms. However, one of the problems in operating these manipulators is the insurance that the control tapes for the various tong motions and also for the elbow pivot will remain in proper relationship when the main horizontal arms are raised or lowered.

SUMMARY OF THE INVENTION

The present invention relates to a compact master-slave manipulator which provides for true motion between the arms in the "Z direction", and also insures at the same time that the relative position between other components of the arms on the master-slave assembly are not changed when the arms providing the "Z motion" are moved. The arms providing the "Z motion" are also counterbalanced by a constant force spring so that the counterbalancing is located entirely on the master side and not in the contaminated area and weights are not needed. The mounting means provide guides for maintaining all control tapes and lengths at substantially constant tension when the manipulator is operated, and particularly when the true motion is being obtained between the arms operating in the "Z direction."

BRIEF DESCRIPTION OF THE DRAWINGS

FIG. 1 is a side elevational view of a true motion manipulator made according to the present invention;

FIG. 2 is a fragmentary top plan view of the mounting portions of the manipulator of the present invention with parts in section and parts broken away;

FIG. 3 is a sectional view taken as on line 3—3 in FIG. 1;

FIGS. 4 and 5 are schematic representations of two extreme upper arm positions showing the system for maintaining the orientation between the arms movable in "Y" direction of the manipulator; and FIGS. 6 and 7 are schematic representations of the extreme position of the manipulator upper arms showing the guide means for maintaining constant tension in control tapes for operating the various grip functions of the manipulator.

DESCRIPTION OF THE PREFERRED EMBODIMENT

A true motion manipulator illustrated generally at 10 has a center mounting housing 11 which has an enlarged flange which is capable of being fastened to a supporting wall which divides the master side illustrated generally at 12 from the slave side of the manipulator which is illustrated generally at 13. The flange of the housing, as shown in FIG. 2, is used to rotatably mount a center tube 14 on a suitable bearing 15 so that the center tube can rotate about the longitudinal axis of the tube 14 with respect to a retaining or dividing wall. The tube 14 is used for mounting a pair of oppositely extending upper arm members. There is a master upper arm member 16 and a slave upper arm member 17. The master and slave upper arm members, as shown in FIG. 1, are substantially horizontal in mid position, and they are pivotally mounted to the center tube assembly with suitable brackets. Brackets 18 fixed to the tube 14 are used for mounting the master upper arm member 16 and the brackets 19 fixed to tube 14 are used for rotatably or pivotally mounting the slave upper arm member. The master arm is mounted about the axis of a shaft 22 and the slave arm is mounted about an axis of a shaft 23. The mounting for the two upper arms is exactly identical.

As shown, the upper arms are each inverted U-shaped cross section members. The master upper arm has brackets 24 fixed to opposite sides or legs of the arm itself, and these brackets 24 in turn are each fixed to a double sprocket assembly 25, including inner sprockets 25A and outer sprockets 25B. The sprockets 25A and 25B are spaced apart and are mounted onto the shaft 22. The shaft 22 is rotatably mounted in the housings 18. The slave arm 17 has brackets 26 fixed on opposite sides of the arms that are in turn fixedly attached to double sprocket assembly 27. Double sprocket assembly 27 includes inner sprockets 27A and outer sprockets 27B. The sprockets 27A and 27B are mounted on the shaft 23 which is rotatably mounted in housings 19. The outer sprockets 25B and the outer sprockets 27B are connected together with chains 30 that are reverse wrapped on the sprockets as shown in FIG. 1. The inner sprockets 25A and inner sprockets 27A are connected together with chains 31 that are mounted on the sprockets and the ends of which are fixed to the sprockets. The chains 30 and 31 have a partial wrap around the sprockets. The chains 31 are wrapped in an opposite direction from the chains 30 on each side of the unit. Thus, because the arms 16 and 17 are each fixed in their respective sets of sprockets, when the master upper arm 16 is raised about the axis of shaft 22, for example, to move the arm in the so-called "Z" direction, the sprockets 25A will pull on chains 31 which in turn pull through the inner sprockets 27A to raise the slave arm. If the master upper arm is raised as in directions indicated by the arrow 32, the slave upper arm 17 will also be raised upwardly or in directions indicated by the arrow 33. When the master arm is lowered, the sprockets 25B pull through chain 30 to actuate sprockets 27B and pull the slave arm down. Thus the center connecting chains and sprockets provide for a "true motion" between the upper arms 16 and 17. The upper arms rotate in opposite directions about their pivot axes, one going clockwise and one counterclockwise.

At the outer ends of the master upper arm and slave upper arms there is mounted a forearm member 36 on the master side, and a forearm member 37 on the slave side. The upper ends of the forearms have mounting brackets 38 and 39, respectively thereon, and these brackets in turn are pivotally mounted about axes of shafts 40 and 41, respectively, to the respective upper arms 16 and 17. The shafts 40 and 41 are pivotally mounted on the master and slave arms 16 and 17, so that the forearms can move in directions as indicated by the double arrow 42 in FIG. 1. Each of the brackets 38 and 39 drivably carries spaced apart pairs of sprockets 43 and 44, respectively. Sprockets 43, on the master side of the unit, carry separate chains 47 thereon (there is actually one sprocket 43 on each side of bracket 38) and the chains wrap around the sprockets 43 and drivably engage them. The ends of the chains 47 are attached to suitable upper and lower cables 45 and 46. The cables 45 and 46 extend along the master upper arm 16, and through separate sets of provided upper and lower guide sheaves which are located on the axes of shafts 22 and 23, respectively. The separate sets of sheaves each comprise a center sheave 50, and top and bottom guide sheaves 51 and 52, respectively. This setup is the same on both the master side and the slave side, and only the sheaves on sprocket assemblies 27 are shown as being typical in FIG. 3. The sheave assemblies are positioned between both sprocket assemblies 25 and sprocket assemblies 27. The cables 45 and 46 then extend through the guide sheaves mounted on sprockets 25 and 27, through the slave arms 17, and are attached to opposite ends of chains 53 which in turn are drivably mounted over the sprockets 44. The chains 53 then control movement of the forearm 37 about its axis of pin 41 and movement of the master arm 36 about pin 40 will drive sprockets 43 and chains 47, which in turn will pull either cables 45 or cables 46, causing the chains 53 to drive sprockets 44 a corresponding amount and pivot the slave arm 37 about the axis of shaft 41 a corresponding amount. The guide sheaves 51 are mounted onto cross pins 54 that attach between sheaves to their respective sprockets 25 and 27, respectively. In FIG. 3, the sprocket assemblies shown are assemblies 27, but exactly the same mounting members are used on the sprocket assemblies 25.

The master side upper arm 36 has a gripper and actuator mechanism 60 attached thereto which can in turn control tongs 61 on the slave side through suitable cables, and in addition the gripper 60 can be rotated about the upright axis of the arm 36 through the use of cables 62 acting on suitable sheaves to rotate the slave tong about the axis of its arm 37. Tong motions and actuating motions are controlled with suitable tapes or cables that are carried from the master side to the slave side in a conventional form as known. This type of cabling arrangement is shown in FIG. 3 of U.S. Pat. No. 3,212,651, and also the use of drive sprockets for controlling the forearms, in the "Y motion" of the manipulator, is also shown in this schematic drawing.

In the present true motion manipulator, in order to insure that the control tapes, which are illustrated generally at 65 in FIG. 3, and which extend from the master side to the slave side do not change in length when the upper arms 16 and 17 are moved about their respective axes, tape guide sheaves 66 are mounted between the respective sprockets 25 and 27, on the same shaft as the sheaves 51, and mating guide sheaves 67 are also mounted on the center shafts 22 and 23, respectively. The tape 65 extends between the mating peripheries of these sheaves as shown typically in FIG. 3, and are guided thereby.

In order to illustrate the operation of the various guide sheaves, in FIG. 4 there is shown a position of the arms 16 and 17 when the arm 16 is raised upwardly its maximum amount, and the cables 45 and 46 are shown schematically. The sheaves 51 and 52 are also shown schematically to show how these sheaves guide the cables so that the length of the cables does not change, and so that the master forearm 36 and the slave forearm 37 will not become loose with respect to each other when the arms 16 and 17 are raised. The converse position is shown in FIG. 5 where the arms 16 and 17 are lowered and here again, the sheaves or guides 51 and 52, as well as the center sheaves 50 properly guide the cables 45 and 46 to insure that the forearms 36 and 37 remain operative. The forearms can be rotated about their axes as the upper arms move to keep the forearms parallel to their original position.

In FIGS. 6 and 7, a typical control cable 65 is shown. In FIG. 6 the upper arms 16 and 17 are shown in their raised positions. Here the sheaves 66 are shown guiding the tape 65 (which is typical) around the periphery of these sheaves to take up any changes in length that might occur because of the shifting of the arms 16 and 17 so that the tapes 65 do not move relative to their operational elements namely, for example, the gripper 60 and the tongs 61. The tapes are not permitted to go slack. When the upper arms 16 and 17 are lowered, the sheaves 66 and 67 again shift with the sprockets 25 and 27, respectively, to guide the tape 65 over the sheaves and take up or compensate for any changes in length that would otherwise occur.

Thus the guide means for the tapes and for the cables for keeping the relative motions of the forearm and the actuating tongs oriented properly move with the sheaves for obtaining the true motions of the main horizontal arms 16 and 17. The shifting guide means for the cables mounted on the drive for obtaining the true motion of the upper arms, provide for this compensation automatically.

The arms are counterbalanced completely with a constant force spring 70 that is attached to the master arm with a suitable bracket 71, and mounts onto a reel 72. The reel 72 is mounted onto a bracket 73 then in turn is fixed to the center tube 14 on the master side of the unit out of the contaminated atmosphere. The spring 70 and reel 72 are the form of a constant force spring sold by Hunter Spring Company, a division of American Machine Metals, Inc. of Lansdale, Pa. under the trademark "Neg'ator." "Neg'ator" is a registered trademark of this company and relates to the constant force springs sold by them, as shown here, their type No. SL 31U69. The constant force spring is a flat strip wound onto the reel and as it unwinds exerts a constant force across its distance of operation.

The constant force spring provides for counterweighting so that the unit is easy to operate, and the use of this type of a spring is a new use which eliminates the actual weights for counterweighting small manipulators but still gives the advantages of having the slave arm and the master arm balanced for easy operation. The spring and its mounting brackets move about the axis of the tube 14 when the unit is rotated about this axis.

By providing for the true motions of the manipulator, and also insuring that the various control tapes that pass from the master side to the slave side do not change in length during operation of the true motion portions of the link in a simple manner (by providing the proper guide sheaves that move with the sprockets controlling the true motion), a low cost manipulator that is readily adaptable to light duty is advanced.

What is claimed is:

1. A master-slave manipulator comprising a mounting housing, first and second arm means pivotally mounted to said mounting housing about first and second pivots on opposite ends thereof, reverse acting drive means between said arm means whereby movement in one direction of rotation of a first arm about its pivot will result in movement in opposite direction of rotation of a second arm about its pivot to give corresponding direction of movement at the outer ends of said first and second arm means, control means to transfer control motions from one arm means to the other, and means mounted on said drive means to maintain said control means in their relative positions regardless of the positions of said arm means.

2. The combination as specified in claim 1 wherein said drive means comprises separate drive members on each of said arm means, and a flexible link between said drive members, said flexible link extending from the bottom portion of the drive member at said first arm means to the top portion of the drive member on said second arm means.

3. The combination as specified in claim 2 wherein said control means comprise flexible members, and said means for maintaining said control means in relative positions comprise sheave members rotatably mounted on said drive members for movement with said drive members when said arm means are moved about their pivots.

4. The combination as specified in claim 2 wherein said drive members comprise sprocket means, and said flexible link is a chain extending between said sprocket means.

5. A master-slave manipulator comprising a center support member, a master arm having an upper arm section and a forearm section, a slave arm having an upper arm section and a forearm section, said upper arm sections being pivotally mounted to opposite ends of said support about parallel upper arm pivot axes, and said forearm sections being pivotally mounted to the respective upper arm sections at the outer ends thereof, said upper arm sections being movable about said upper arm pivot axes between predetermined angular positions, separate actuator means fixedly mounted to each of said upper arm sections, linking means between said separate actuator means whereby upward movement of said master upper arm section will result in upward movement of said slave upper arm section about their respective upper arm pivot axes, drive and link means between said forearm sections, said drive and link means passing through said upper arm sections and through said support, and guide means mounted on said actuator means for said drive and link means, said link means being flexible, said guide means moving said actuator means when said upper arm sections are moved, said guide means controlling said link means to maintain substantially constant tension in said link means during movement of the upper arm sections.

6. The combination as specified in claim 5 wherein said guide means comprises a separate center sheave member mounted on the upper arm pivot axes respectively, and separate guide sheaves movable with the respective actuator and spaced from the upper arm pivot axes and holding said link means between the outer peripheries of said center sheave members and the outer peripheries of said respective guide sheaves.

7. The combination as specified in claim 6 wherein there is a control actuator on said master arm, and an actuatable member on said slave arm, and wherein control tape means causes actuation between said control actuator and said actuable member, and guide means on said actuator means to maintain substantially identical position of said tape means relative to the control actuator and actuable member when said upper arms are moved about their respective axes.

8. The combination as specified in claim 7 wherein said control tape guide means comprise sheave means, first sheaves mounted on the separate upper arm pivot axes, and second sheaves mounted to said actuator members and movable therewith, said tape being positioned and held between the peripheries of sheave means at both of said upper arm pivot axes.

9. A master-slave manipulator comprising a mounting housing, first and second arm means pivotally mounted to said mounting housing about first and second pivots on opposite ends thereof, reverse acting drive means between said arm means whereby movement in one direction of rotation of a first arm about its pivot will result in movement in opposite direction of rotation of a second arm about its pivot to give corresponding direction of movement at the outer ends of said first and second arm means, control means to transfer control motions from one arm means to the other, and counter balance means for said arms comprising constant force spring means between the mounting housing and one of said arms operative across the normal range of movement of said arms.

10. The manipulator of claim 9 wherein said arm means comprise arm sections extending substantially horizontally from the mounting housing at least in one position of pivoting movement about the first and second pivots.

* * * * *

UNITED STATES PATENT OFFICE
CERTIFICATE OF CORRECTION

Patent No. 3,650,410      Dated March 21, 1972

Inventor(s) Robert W. Wiesener

It is certified that error appears in the above-identified patent and that said Letters Patent are hereby corrected as shown below:

Column 4, line 34, (Claim 1, line 11) after "on" insert --and movable with--; Column 4, line 71, (Claim 5, line 19) after "moving" insert --with--.

Signed and sealed this 11th day of July 1972.

(SEAL)
Attest:

EDWARD M. FLETCHER, JR.　　　　ROBERT GOTTSCHALK
Attesting Officer　　　　　　　　Commissioner of Patents